(12) United States Patent
Delmoni

(10) Patent No.: US 10,829,311 B2
(45) Date of Patent: Nov. 10, 2020

(54) BELT SCRAPER

(71) Applicant: Autonomous Tensioning System Pty Ltd, Stockton (AU)

(72) Inventor: Alex Delmoni, Stockton (AU)

(73) Assignee: Autonomous Tensioning System Pty Ltd, Stockton (AU)

( * ) Notice: Subject to any disclaimer, the term of this patent is extended or adjusted under 35 U.S.C. 154(b) by 0 days.

(21) Appl. No.: 16/099,040

(22) PCT Filed: Apr. 24, 2017

(86) PCT No.: PCT/AU2017/050374
§ 371 (c)(1),
(2) Date: Nov. 5, 2018

(87) PCT Pub. No.: WO2017/190182
PCT Pub. Date: Nov. 9, 2017

(65) Prior Publication Data
US 2019/0177093 A1    Jun. 13, 2019

(30) Foreign Application Priority Data
May 6, 2016  (AU) ................................ 2016901665

(51) Int. Cl.
*B65G 45/16*    (2006.01)
*F15B 1/04*    (2006.01)

(52) U.S. Cl.
CPC .............. *B65G 45/16* (2013.01); *F15B 1/045* (2013.01)

(58) Field of Classification Search
CPC ......... B65G 45/12; B65G 45/14; B65G 45/16

USPC ......................................... 198/497, 498, 499
See application file for complete search history.

(56) References Cited

U.S. PATENT DOCUMENTS

| 1,582,985 | A |   | 5/1926 | Hanel |   |
|---|---|---|---|---|---|
| 4,189,046 | A |   | 2/1980 | Ward |   |
| 4,520,917 | A | * | 6/1985 | Sillivent | B65G 45/16 198/499 |
| 5,007,524 | A | * | 4/1991 | Morefield | B65G 45/16 15/256.5 |
| 5,248,026 | A |   | 9/1993 | Morefield |   |

(Continued)

FOREIGN PATENT DOCUMENTS

| DE | 390701 | 2/1924 |
|---|---|---|
| DE | 3511277 | 10/1986 |
| DE | 19926184 | 12/2000 |

(Continued)

OTHER PUBLICATIONS

International Search Report for Application No. PCT/AU2017/050374 dated May 22, 2017 (3 pages).

(Continued)

*Primary Examiner* — William R Harp
(74) *Attorney, Agent, or Firm* — Michael Best & Friedrich LLP

(57) ABSTRACT

A tensioning arrangement for a scraper for a conveyor belt, the tensioning arrangement comprising a hydraulic assembly that acts on the scraper to maintain a portion of the scraper in operative contact with the conveyor belt, the hydraulic assembly configured such that weight applied to a portion of the hydraulic assembly effects application of pressure on fluid contained within the hydraulic assembly.

14 Claims, 6 Drawing Sheets

(56) References Cited

U.S. PATENT DOCUMENTS

| | | | | | |
|---|---|---|---|---|---|
| 5,722,528 | A | * | 3/1998 | Dolan ................... | B65G 45/16 198/499 |
| 7,837,021 | B2 | * | 11/2010 | Ichikawa ................ | B66B 23/18 198/329 |

FOREIGN PATENT DOCUMENTS

| | | |
|---|---|---|
| DE | 102007007337 | 8/2008 |
| GB | 191303302 | 11/1913 |
| JP | 5837301 | 3/1983 |
| WO | 1993004959 | 3/1993 |

OTHER PUBLICATIONS

International Preliminary Report on Patentability for Application No. PCT/AU2017/050374 dated Aug. 31, 2018 (37 pages).

* cited by examiner

BELT SCRAPER

BACKGROUND

The disclosure relates to materials handling, and more particularly to a tensioning arrangement for a conveyor belt cleaner.

SUMMARY

In a first aspect, disclosed in some forms is a tensioning arrangement for a scraper for a conveyor belt, the tensioning arrangement comprising a hydraulic assembly that acts on the scraper to maintain a portion of the scraper in operative contact with the conveyor belt, the hydraulic assembly configured such that weight applied to a portion of the hydraulic assembly effects application of pressure on fluid contained within the hydraulic assembly.

Utilising a hydraulic assembly for maintaining a belt scraper in operative contact with a conveyor belt during use may have benefits over alternative tensioning systems such as spring or counterweight based tensioning systems. In some forms the hydraulic assembly maintains tip pressure over the required maintenance interval. The hydraulic system may provide a more consistent pressure than alternatives. When the blades wear the displacement of the springs results in a reduction in the applied blade tip performance. In contrast, hydraulic tension is not reduced through wear of the blades. Similarly fixed bolt tensioners wear, losing tip pressure. The hydraulic tensioning assembly also provides capacitance within the system which can be beneficial in materials applications.

Known scrapers can result in poor performance, damage to belts, abrasion from ore, contamination of bearings, eccentric loading of idler, damage to pulleys and additional labour and clean up. Known spring style scrapers can suffer from product build up within the springs and spillage engulfment of the springs. When dried out this can concrete and lock up the spring movement rendering the scraper inoperable.

In a second aspect, disclosed is a conveyor belt scraper assembly comprising a scraper blade to contact a conveyor belt to remove materials from a conveyor belt while the conveyor belt is in use; and a hydraulic tensioning arrangement which biases the scraper blade into operative contact with the conveyor belt.

In some forms the hydraulic tensioning arrangement comprises a single-acting piston and cylinder assembly oriented substantially vertically and having a dead-weight accumulator biasing the piston and cylinder assembly into a return configuration.

BRIEF DESCRIPTION OF THE FIGURES

The embodiments will now be described in view of the Figures, in which.

DETAILED DESCRIPTION OF EMBODIMENTS OF THE DISCLOSURE

Figure 1:
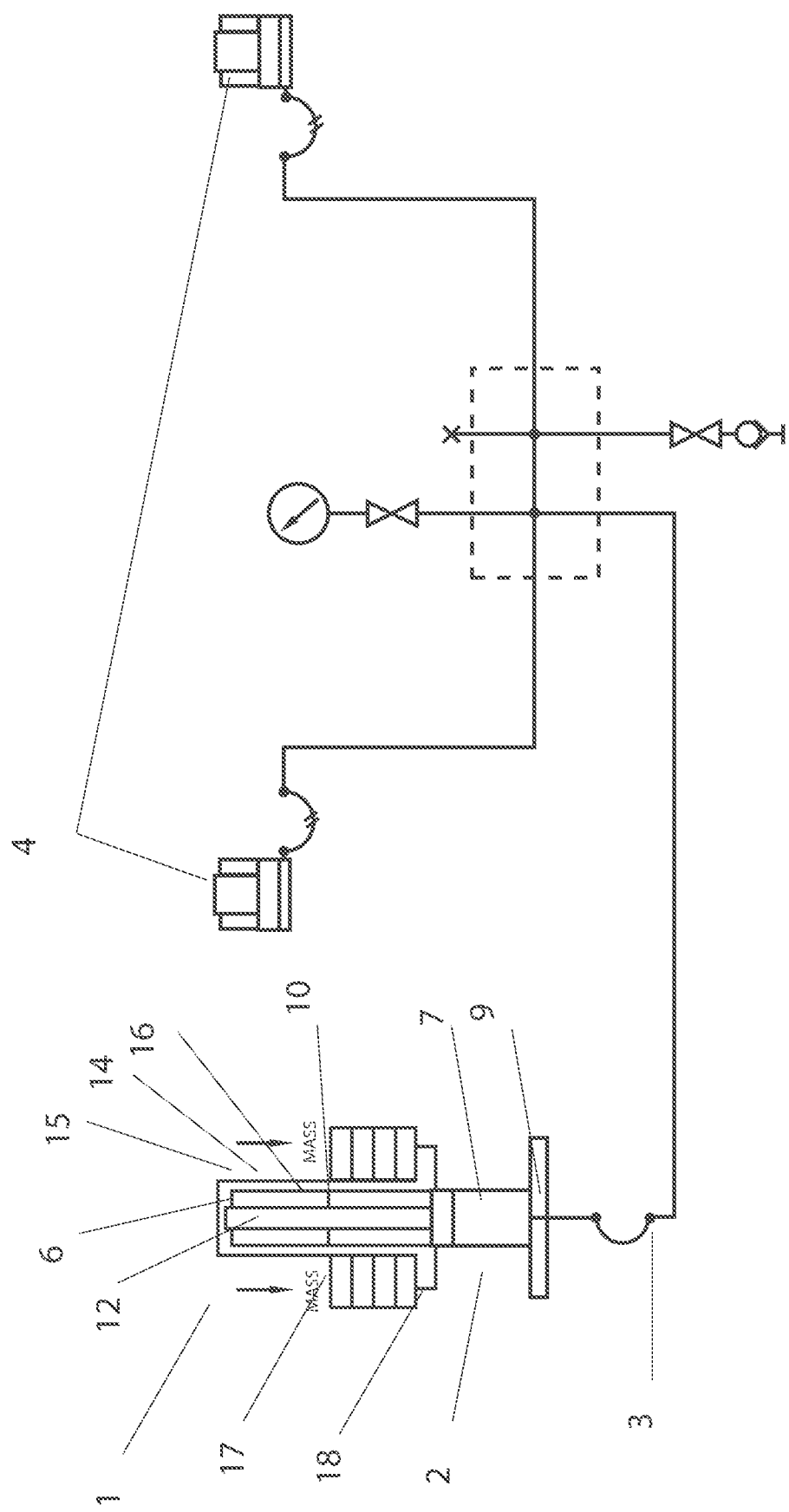
FIG. 1 is a plan view of one embodiment of a hydraulic assembly of the present disclosure.

Disclosed in some forms is a tensioning arrangement for a scraper for a conveyor belt, the tensioning arrangement comprising a hydraulic assembly that acts on the scraper to maintain a portion of the scraper in operative contact with the conveyor belt, the hydraulic assembly configured such that weight applied to a portion of the hydraulic assembly effects application of pressure on fluid contained within the hydraulic assembly.

In some forms the hydraulic assembly includes a holding piston and cylinder assembly, the holding piston and cylinder assembly being single-acting, wherein weight applied to one of the piston or cylinder applies pressure on fluid contained within the hydraulic assembly.

In some forms the holding piston and cylinder assembly is in fluid communication with at least one scraper piston and cylinder assembly that acts upon the scraper to maintain a portion of the scraper in operative contact with the conveyor belt.

In some forms the holding piston and cylinder assembly is configured to be positioned in use in a substantially vertical orientation, the cap end of the cylinder being positioned lower than the rod end of the cylinder and wherein weight is applied to the piston at a point outside the cylinder to bias the piston into a return configuration.

In some forms the holding piston and cylinder assembly further includes a weight retainer having a piston engagement portion that engages the piston; a body that extends downwardly from the piston engagement portion and defines an interior cavity in which the piston and at least a portion of the cylinder is sheathed; and, a weight locator to allow application of weight to the weight retainer, the weight downwardly biasing the weight retainer and therefore biasing the piston into a return configuration.

In some forms the weight retainer is shaped to limit ingress of material into the holding piston and cylinder assembly.

In some forms the tensioning assembly is configured such that initial fluid pressure is provided by a hand pump.

Further disclosed is a conveyor belt scraper assembly comprising a scraper blade to contact a conveyor belt to remove materials from a conveyor belt while the conveyor belt is in use; a hydraulic tensioning assembly biasing the scraper blade into operative contact with the conveyor belt.

In some forms the hydraulic tensioner comprises a single-acting piston and cylinder assembly oriented substantially vertically and having a dead-weight accumulator biasing the piston and cylinder assembly into a return configuration.

In some forms the single-acting piston and cylinder assembly is oriented such that the cap end is positioned lower than the rod end and weight is placed on the piston to bias the piston and cylinder assembly into a return configuration.

In some forms the assembly further comprises a sheath acting to sheath the rod end of the cylinder throughout movement of the piston.

In some forms the sheath is engaged with the piston.

In some forms weight is retained by the sheath to bias the piston and cylinder assembly into a return configuration. In some forms the weight retainer is engaged with or forms part of the sheath.

It is known to utilise a scraper to clear a conveyor belt. This clearing of the conveyor belt is ordinarily performed in the vicinity of the discharge pulley and is designed to prevent material accumulations on the belt which will result in idler damage and undesired material build-up alongside the belt path. Efficient scraping of the belt surface requires that a scraper blade is angled and pressed against the belt with sufficient force to dislodge resistant material such as slurries and sticky materials. This can be difficult to achieve where the belt has an uneven surface or a varying belt thickness.

Previously known scraper assemblies have the scraper blades biased into contact with the conveyor belt by springs to give them sufficient flexibility to take account of sudden variations in the belt surface. However, the spring-loaded units suffer from the disadvantage that as the blades wear there is a reduction in tension.

Generally conveyor belt scrapers also known as belt cleaners are of a fixed bolt tensioner, a swing arm direct counterweight or a spring design to provide the required forces for the belt scraper tips to maintain the correct contact with the belt and the resulting removal of residue product. The present disclosure provides an alternative.

It is also known to utilise counterweights biasing the scraper blades into contact with the conveyor belt. The hydraulic assembly has the benefit that it may create capacitance and resists shock which may result in a longer wear time for the scraper blades and a reduction in blade chatter.

In many raw material processing plants the main feeder conveyor belts supply material to a selection of temporary storage feeder bins. The main feeder conveyor travels to the top of the bins which are adjacent to each other. The conveyor feeder mobile structure is commonly known as a "shuttle" which travels horizontally to feed the material into the selected bin.

The upper area of the bins & shuttle referred to above is minimal & inaccessible unless the plant is shut down. With this access restriction, maintenance of the shuttle and components is not possible during production periods.

In most cases the only services supplied to the hydraulic assembly and supplied to the shuttle are water for sprays and high voltage to the head pulley belt drive if the drive is on the shuttle. Therefore the capacitance of the assembly is significant.

Due to belt scraper tips tension not being maintained product spillage and losses can run into major costs. Excessive build-up of product on the conveyor belt can result in reduced longevity of conveyor rollers, conveyor pulleys and conveyor belting.

The belt scraper of the present disclosure is in some aspects, autonomous and self adjusting with no external energy sources required. In some forms it may provide a constant pressure achieved for a long period or over the service life of the blades. In some forms, the applied load may be balanced on both sides of the pole. In some forms the system characteristics may have inherent dampening. This reduces blade chatter and bushing/slide wear. In some forms the blade wear is predictable promoting planned blade replacement intervals. In some forms the blade force doesn't have to be re-commissioned after each consumable rebuild. In some forms the counterweight can be modified in a safe location outside of guarding. This reduces access issues. In some forms t stops are incorporated to limit the system travel to prevent any risks of exceeding the blade wear limits.

Figure 2:
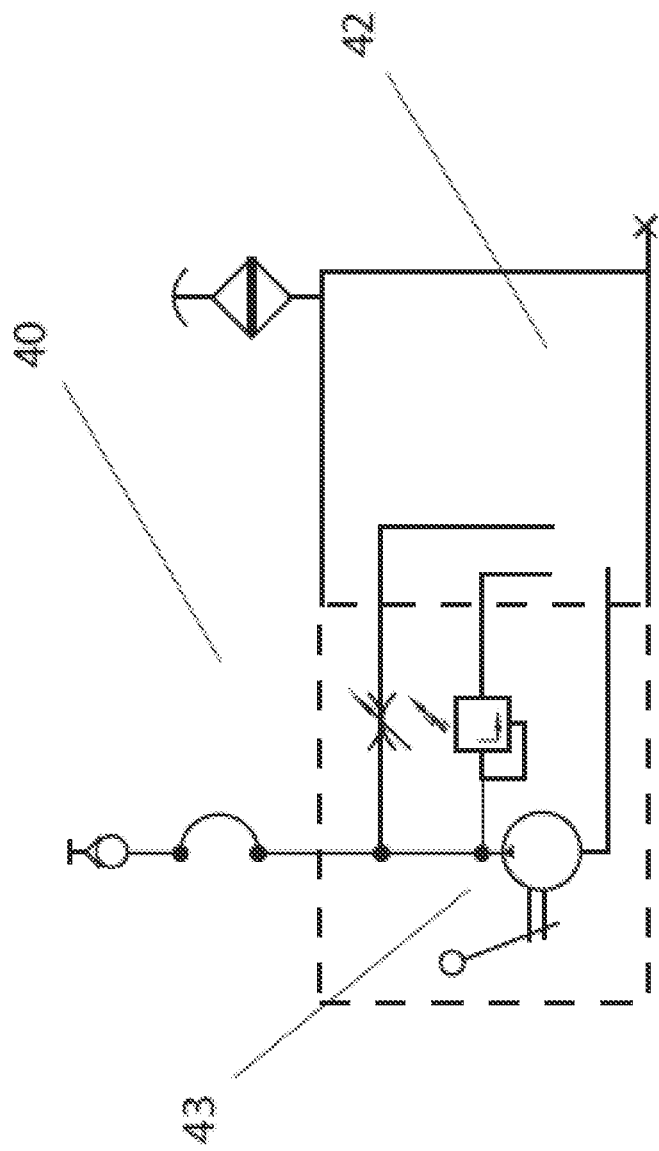
FIG. 2 is a plan view of one embodiment of a hand pump for use with a hydraulic assembly such as that in FIG. 1.

Referring to FIGS. 1 and 2, disclosed is a tensioning assembly 1 for a conveyor belt scraper (not illustrated). The tensioning assembly 1 is hydraulic and comprises a holding piston and cylinder assembly 2 in fluid communication with a plurality of scraper piston and cylinder assemblies 4 via hosing 3. In the illustrated form there are two scraper piston and cylinder assemblies 4 which engage with the scraper to maintain it in operative contact with the conveyor belt.

The holding piston and cylinder assembly 2 is a single-acting assembly which in use is oriented in a substantially vertical orientation. In this form, the holding piston and cylinder assembly comprises a piston 6 and cylinder 7. The cylinder 7 is oriented such that the cap end 9 is located downwardly with respect to the rod end 10. Fluid is retained in the cylinder 7 between the cap end 9 and the piston 6.

The piston 6 includes a rod 12 which extends from the rod end 10 of the cylinder 7. The rod 12 is moveable between an extended configuration in which the rod extends from the rod end 30 of the cylinder 7 and a return configuration in which more of the rod 12 is located within the cylinder 7.

The piston 6 is biased into the return configuration by means of weights on which gravity acts to move the piston 6 downwardly with respect to the cylinder 7. The weights bias the piston and cylinder assembly into contraction, that is into the return configuration.

In the illustrated form, the piston 6 is engaged with a weight retainer 14 which extends over the piston 6 and engages the piston 6 at an upper piston engagement end 15. The weight retainer 14 further includes a sheath body 16 which extends downwardly from the piston engagement end 15. In use, the sheath body acts to cover the rod end 10 of the cylinder 7 throughout the rod's motion into the extended configuration. This limits ingress of material into the rod end of the cylinder and extends the life of the cylinder.

Weights 17 are engaged with the weight retainer 14 by means of a weight engagement end 18 and bias the piston into the return position.

Figure 3:
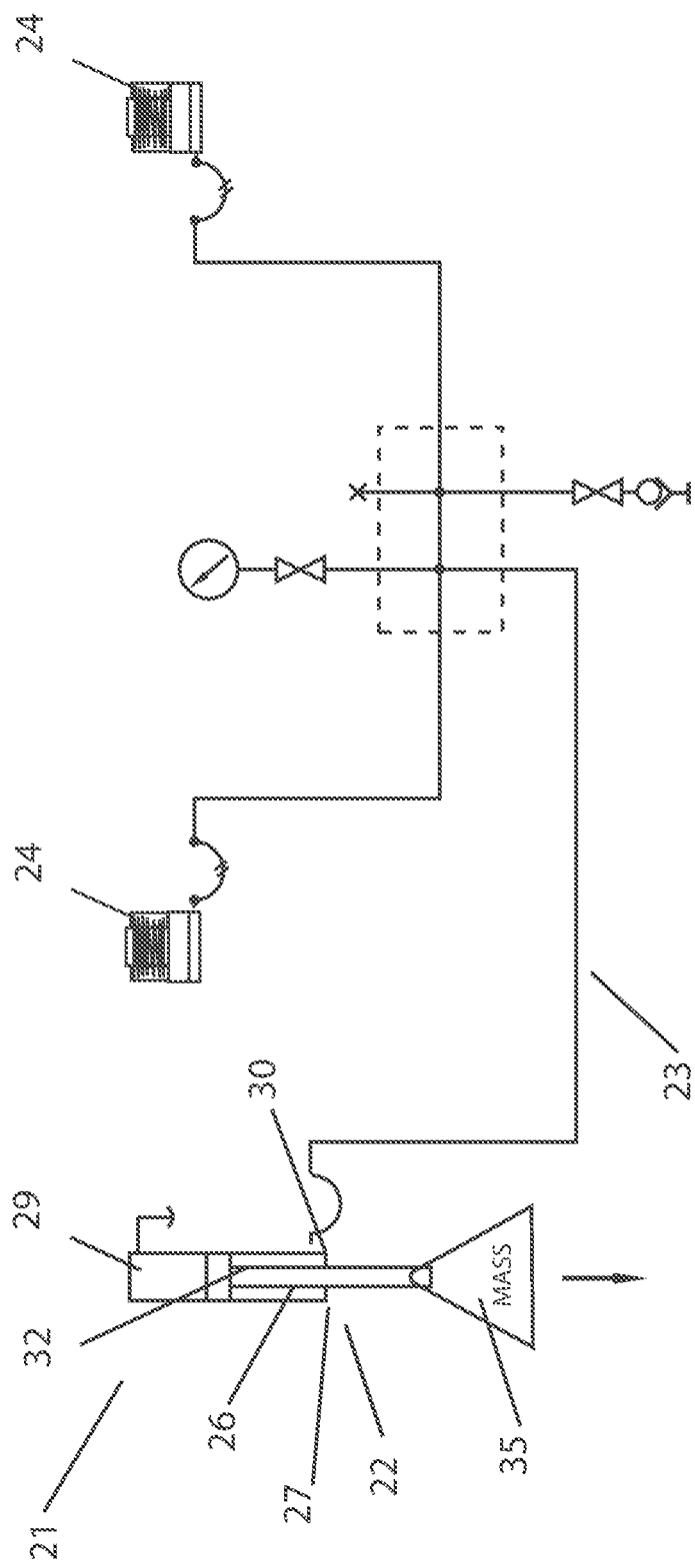
FIG. 3 is a plan view of a second embodiment of a hydraulic assembly of the present disclosure.
Figure 4:
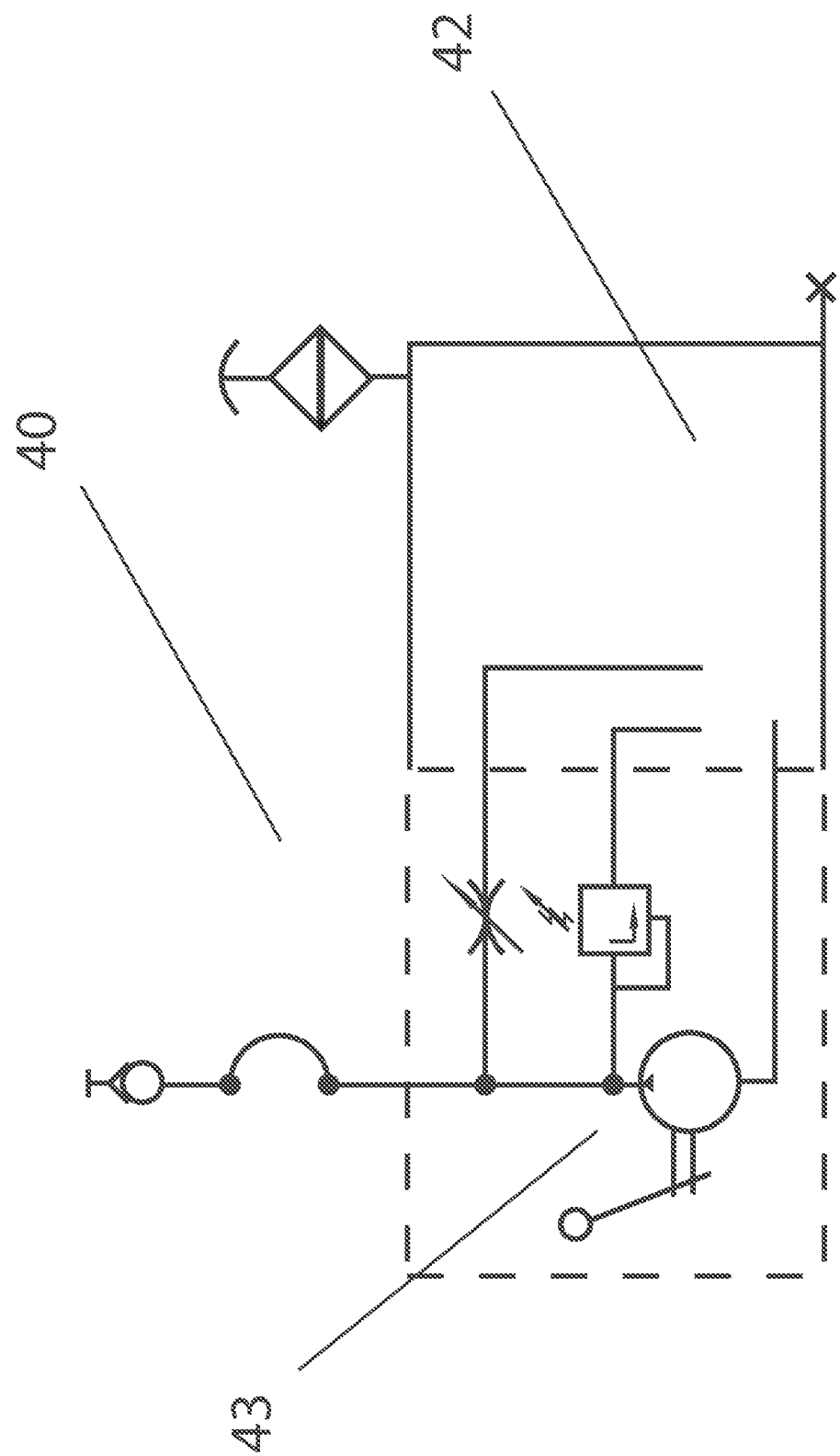
FIG. 4 is a plan view of a second embodiment of a hand pump for use with a hydraulic assembly such as that in FIG. 3.

Referring now to FIGS. 3 and 4, disclosed is a tensioning assembly 21 for a conveyor belt scraper (not illustrated). The tensioning assembly 21 is hydraulic and comprises a holding piston and cylinder assembly 22 in fluid communication with a plurality of scraper piston and cylinder assemblies 24 via hosing 23. In the illustrated form there are two scraper piston and cylinder assemblies 24 which engage with the scraper to maintain it in operative contact with the conveyor belt.

The holding piston and cylinder assembly 22 is a single-acting assembly which in use is oriented in a substantially vertical orientation. In this form, the holding piston and cylinder assembly comprises a piston 26 and cylinder 27. The cylinder 27 is oriented such that the cap end 29 is located upwardly with respect to the rod end 30. Fluid is retained in the cylinder 7 between the rod end 30 and the piston 26.

The piston 26 includes a rod 32 which extends from the rod end 30 of the cylinder 27. The rod 32 is moveable between an extended configuration in which the rod extends from the rod end 30 of the cylinder 27 and a return configuration in which more of the rod 32 is located within the cylinder 27.

The piston 26 is biased into the extended configuration by means of weights on which gravity acts to move the piston 26 downwardly with respect to the cylinder 27. Pressure on the fluid happens when the piston extends from the cylinder.

In the illustrated form, the piston 26 is engaged with weights 35. The weights 35 extend downwardly from the rod end 30 and put pressure on the fluid. Weights 17 are engaged with the piston rod.

Also shown is a hand pump 40 which is configured to pump fluid into the hydraulic assembly. The hand pump 40 comprises a reservoir 42 and an actuator 43.

Figure 5:
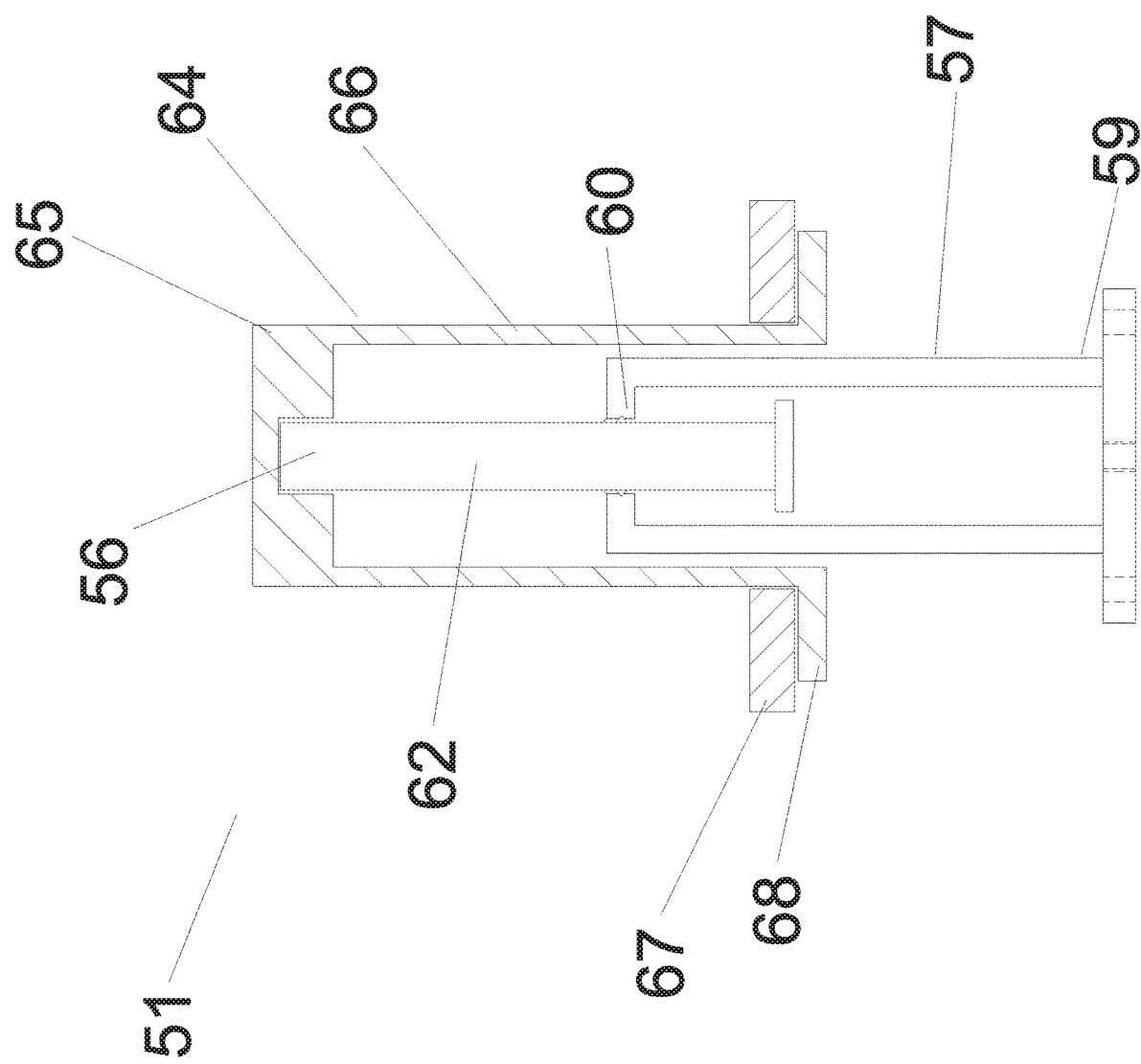
FIG. 5 is a cross sectional view of a piston and cylinder assembly of one embodiment of the disclosure.

Referring to FIG. 5, disclosed is a holding piston and cylinder assembly 51. The holding piston and cylinder assembly is a single-acting assembly which in use is oriented in a substantially vertical orientation. In this form, the holding piston and cylinder assembly comprises a piston 56 and cylinder 57. The cylinder 57 is oriented such that the cap end 59 is located downwardly with respect to the rod end 60. Fluid is retained in the cylinder 7.

The piston 56 includes a rod 62 which extends from the rod end 65 of the cylinder 67. The rod 62 is moveable between an extended configuration in which the rod extends from the rod end 60 of the cylinder 57 and a return configuration in which more of the rod 62 is located within the cylinder 57.

The piston 56 is biased into the return configuration by means of weights on which gravity acts to move the piston 56 downwardly with respect to the cylinder 57.

In the illustrated form, the piston 56 is engaged with a weight retainer 64 which extends over the piston 56 and engages the piston 56 at an upper piston engagement end 65. The weight retainer 64 further includes a sheath body 66 which extends downwardly from the piston engagement end 65. In use, the sheath body acts to cover the rod end 60 of the cylinder 57 throughout the rod's motion into the extended configuration. This limits ingress of material into the rod end of the cylinder and extends the life of the cylinder.

Weights 67 are engaged with the weight retainer 64 by means of a weight engagement end 68.

Figure 8:
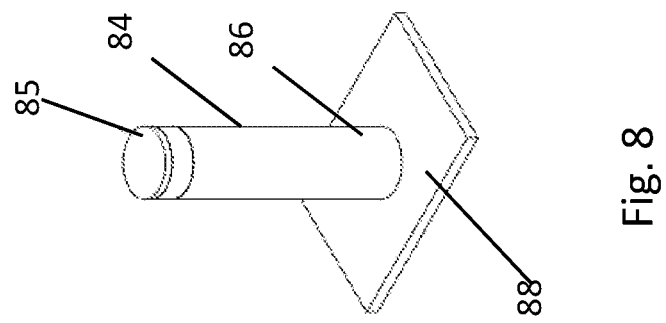
FIG. 8 is a perspective view of the weight retainer of FIG. 6.
Figure 7:
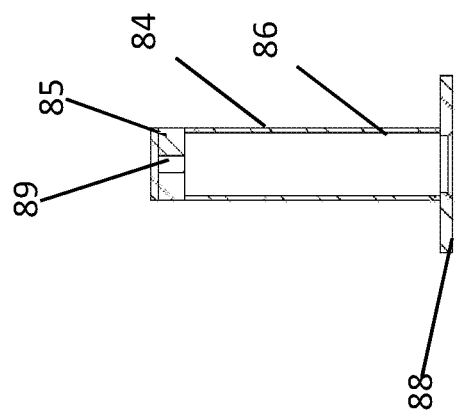
FIG. 7 is a cross-sectional view of the weight retainer of FIG. 6.
Figure 6:
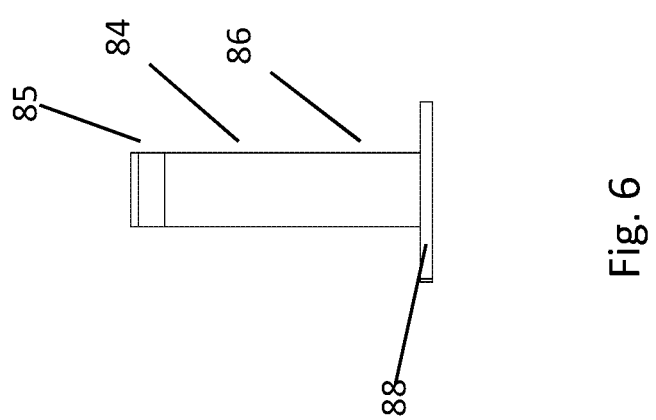
FIG. 6 is a side view of weight retainer of one embodiment of the disclosure.

Referring to FIGS. 6-8, disclosed is a weight retainer 84 for use with a piston and cylinder assembly in which the piston and cylinder is inverted such that the cap end is located upward of the rod end. The weight retainer comprises a piston engagement end 85 which engages the piston shaft in its shaft cavity 89. The body 86 or sheath of the retainer extends downwardly from the piston engagement end. It extends as a piping section with an internal cavity such that the piston and a portion of the cylinder can be located in them.

Weights can be located on a weight retention platform 88 at the base of the weight retainer 84. These bias the weight retainer downwardly.

It will be clear that alternative configurations will fall into the scope of the claims. Linear transmission may be included to record scraper wear. Further, pressure transmission may be included to record tip tension force. A spike in pressure may show an issue or change in thickness on the belt.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A tensioning arrangement for a scraper for a conveyor belt, the tensioning arrangement comprising:
   a hydraulic assembly that acts hydraulically on the scraper to maintain a portion of the scraper in operative contact with the conveyor belt, the hydraulic assembly configured such that weight applied to a portion of the hydraulic assembly effects application of pressure on fluid contained within the hydraulic assembly, the hydraulic assembly including a holding piston and cylinder assembly, the holding piston and cylinder assembly being single-acting and in direct fluid communication with at least one belt scraper piston and cylinder assembly, wherein the weight applied to one of the holding piston or cylinder applies pressure on fluid contained within the hydraulic assembly, said pressure acting in the at least one belt scraper piston and cylinder assembly providing a force on the scraper determined by the weight.

2. A tensioning arrangement as defined in claim 1, wherein the holding piston and cylinder is configured to be positioned in use in a substantially vertical orientation, the cap end of the cylinder being positioned lower than the rod end of the cylinder and wherein weight is applied to the piston at a point outside the cylinder to bias the piston towards a contraction configuration.

3. A tensioning arrangement as defined in claim 2, the holding piston and cylinder assembly further including a weight retainer having:
   a piston engagement portion that engages the piston;
   a body that extends downwardly from the piston engagement portion and defines an interior cavity in which the piston and at least a portion of the cylinder is sheathed; and,
   a weight retainer to allow application of weight to the weight retainer, the weight downwardly biasing the weight retainer and therefore biasing the piston into a contraction configuration.

4. A tensioning arrangement as defined in claim 3, wherein the weight retainer is shaped to cover a portion of the piston and cylinder to limit ingress of material into the holding piston and cylinder assembly.

5. A tensioning arrangement as defined in claim 3, wherein the weight retainer comprises a sheath.

6. A tensioning arrangement as defined in claim 1, configured such that initial fluid pressure is provided by a hand pump.

7. A tensioning arrangement as defined in claim 1, wherein the holding piston and cylinder is configured to be positioned in use in a substantially vertical orientation, a rod end of the cylinder being positioned lower than a cap end of the cylinder and wherein the weight is applied to the piston at a point outside the cylinder to bias the piston towards an extended configuration.

8. A conveyor belt scraper assembly comprising:
   a scraper blade to remove materials from a conveyor belt while the conveyor belt is in use;
   a hydraulic tensioning assembly which hydraulically biases the scraper blade toward the conveyor belt,
   wherein the hydraulic tensioning assembly comprises a holding piston and cylinder assembly oriented substantially vertically and a weight together providing a dead-weight accumulator, the holding piston and cylinder assembly being in direct fluid communication with at least one belt scraper piston and cylinder assembly, wherein weight applied to one of the piston or cylinder of the holding piston and cylinder assembly applies pressure on fluid contained within the hydraulic assembly, said pressure acting in the at least one belt scraper piston and cylinder assembly providing a force on the scraper determined by the weight.

9. A conveyor belt scraper assembly as defined in claim 8, wherein the holding piston and cylinder assembly is oriented such that a cap end is positioned lower than a rod end and the weight is placed on the piston to bias the holding piston and cylinder assembly towards a contraction configuration.

10. A conveyor belt scraper assembly as defined in claim 9, further comprising a sheath acting to sheath the rod end of the cylinder throughout movement of the piston.

11. A conveyor belt scraper assembly as defined in claim 10, wherein the sheath is engaged with the piston.

12. A conveyor belt scraper assembly as defined in claim 11, wherein weight is retained by the sheath to bias the piston and cylinder assembly into a contraction configuration.

13. A conveyor belt scraper assembly as defined in claim 8, further comprising two scraper piston and cylinder assemblies each in direct fluid communication with the holding piston and cylinder assembly such that hydraulic pressure from the holding piston and cylinder assembly is transferred to the scraper piston and cylinder assemblies and wherein the scraper piston and cylinder assemblies act upon the scraper to maintain a portion of the scraper in operative contact with the conveyor belt.

14. A conveyor belt scraper assembly as defined in claim 8, wherein the holding piston and cylinder assembly is oriented such that a rod end is positioned lower than a cap end and the weight is applied to the piston to bias the holding piston and cylinder assembly towards an extended configuration.

\* \* \* \* \*